Nov. 16, 1965 B. EDWARDS 3,218,379
PROCESS AND APPARATUS FOR FORMING PLASTIC CUPS OR THE LIKE
Filed Jan. 2, 1963 2 Sheets-Sheet 2
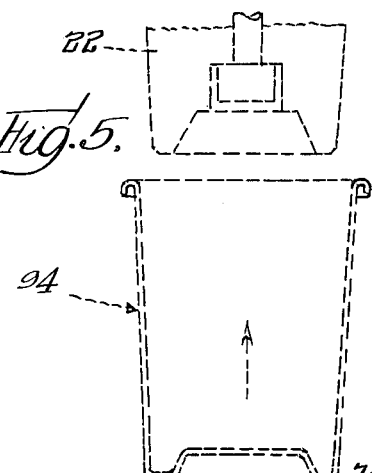
Fig. 5.
Fig. 4.
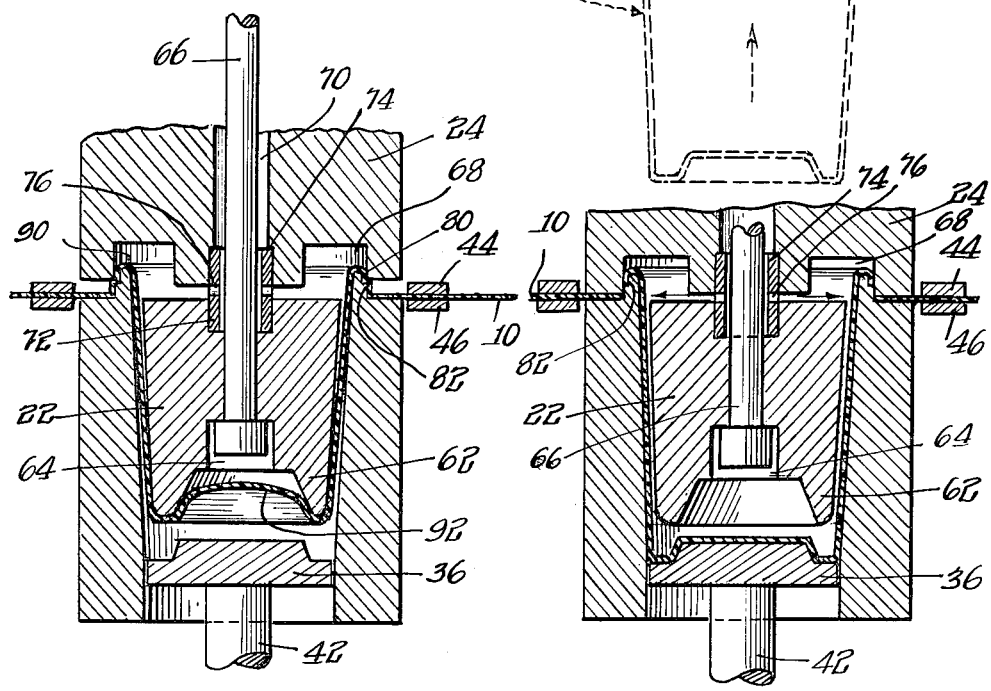
Fig. 6.
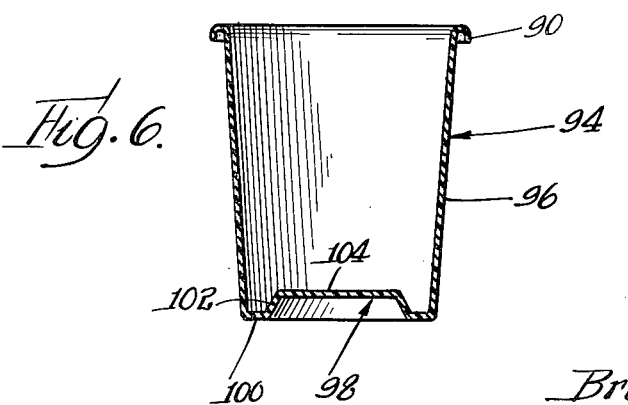
INVENTOR.
Bryant Edwards
BY
Olson, Trexler
Wolters & Bushnell  attys

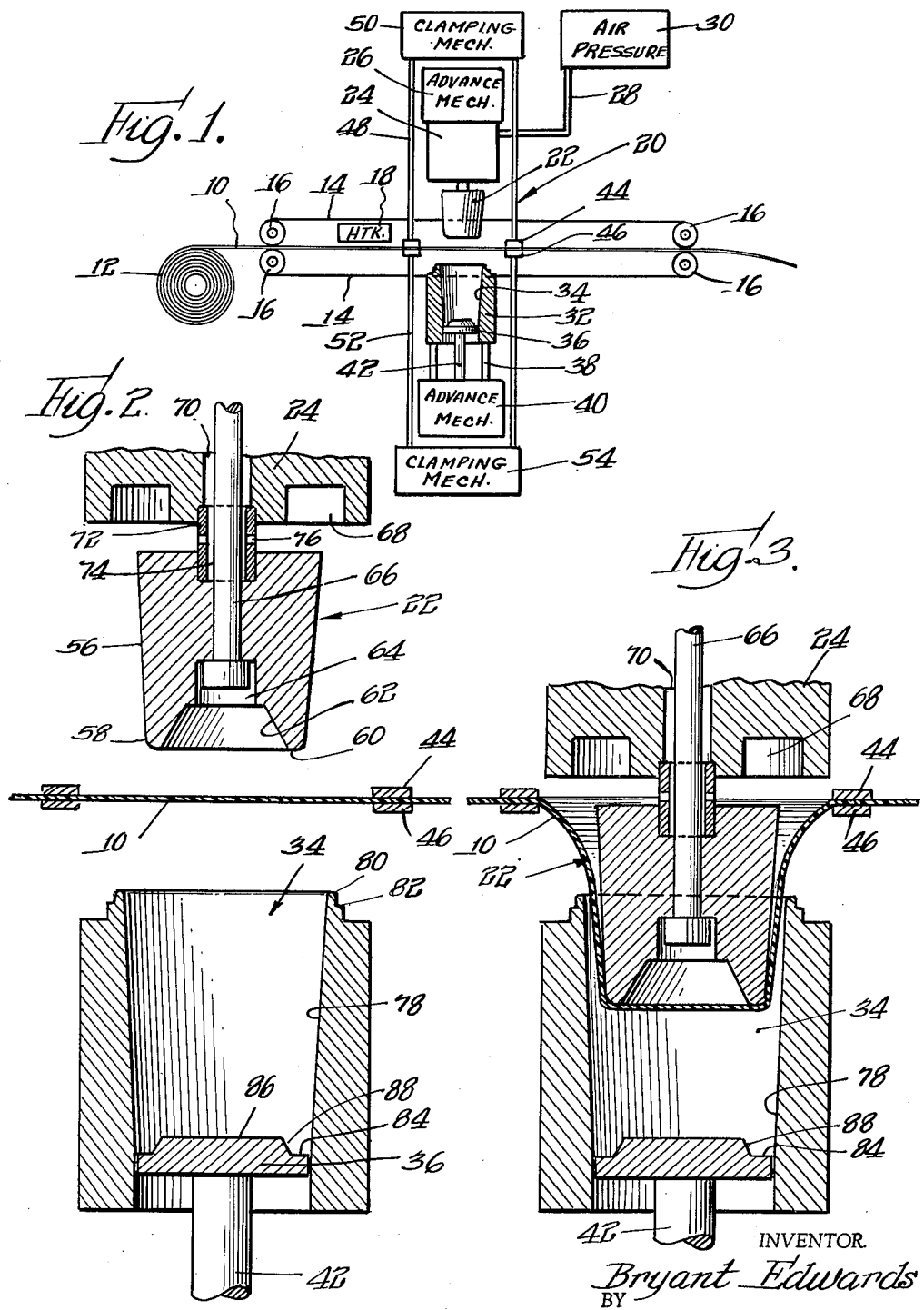

United States Patent Office 3,218,379
Patented Nov. 16, 1965

3,218,379
PROCESS AND APPARATUS FOR FORMING
PLASTIC CUPS OR THE LIKE
Bryant Edwards, Clarendon Hills, Ill., assignor to Illinois
Tool Works Inc., Chicago, Ill., a corporation of Delaware
Filed Jan. 2, 1963, Ser. No. 248,948
4 Claims. (Cl. 264—93)

This invention is concerned with a molded plastic cup or the like container of the throw-away variety, and more particularly with an improved apparatus for forming such cup.

Expendable or throw-away cups are well-known and are widely available on the market. For a great many years, all such cups were made of paper, generally coated or impregnated with wax or plastic.

Paper cups have many inherent drawbacks, most of which have been overcome in recent years by the introduction of thin-wall plastic cups. Such cups, usually made by various molding processes from sheet plastic stock are competitive in price with paper cups. They possesses many advantages thereover, including a more favorable "touch" to the lips of the user, the absence of moisture absorption and vapor transmission, and the absence of any seams requiring glue or adhesive. The glue or adhesive often provides a weakness in structure and seams are generally unsightly. Plastic cups are molded by high temperature techniques that automatically sterilize the plastic material. The plastic is not subject to contamination by bacteria or fungus, and plastic cups can be molded in any desired colors without any material increase in cost, thereby avoiding the necessity of printing, such as is done in connection with paper cups to improve the appearance thereof.

As will be understood, a certain minimum thickness of plastic is necessary in the finished cup. Certain areas of a cup molded or blown from sheet material, tend to be thinner than other areas. This is particularly true in the bottom portion of the cup, and particularly at the junction of the bottom and sidewall. It will be apparent that if this thinner area is to be of requisite strength and thickness, then other areas may be expected to be thicker than necessary, thereby wasting material. Obviously, in view of the foregoing, a minimum amount of material will be used commensurate with requisite strength if a substantially uniform thickness can be maintained.

One object of the invention is to provide an improved process for forming plastic cups and the like.

Accordingly, it is an object of the present invention to provide apparatus for producing plastic cups of substantially uniform thickness throughout.

It is another object of this invention to provide an improved apparatus for forming plastic cups with upwardly indented bottoms.

Other and further objects and advantages of the present invention will be apparent from the following description when taken in connection with the accompanying drawings wherein:

FIG. 1 is a somewhat schematic side view partly in section of an apparatus constructed in accordance with the present invention;

FIG. 2 is an axial sectional view on an enlarged scale through the mandrel and female mold in one position of operation;

FIG. 3 is a sectional view similar to FIG. 2 with the parts in a subsequent position of operation;

FIG. 4 is a similar view with the parts in yet another subsequent position of operation;

FIG. 5 is a similar view showing the final position of the operator.

FIGURE 6 is a section view of the final product.

Referring now in greater particularity to the drawings, and first to FIG. 1, there will be seen a web 10 of plastic material, polystyrene being one satisfactory example, supplied from a roll 12 thereof. The web 10 is carried along a horizontal path by suitable conveyor means such as pairs of opposed drive belts 14 passing over pulleys, rollers or wheels 16, at least some of which are driven by any suitable power source (not shown). As will be understood, the belts 14 may be provided with suitable backup rollers to assure linearity of the confronting belt reaches engageable with the web 10.

The belts 14 carry the web of plastic material 10 past a heater 18, conveniently an electric resistance heater, whereby the plastic material is heated to a plastic temperature. The plastic web is then carried to a forming station indicated generally by the numeral 20. The parts thereof are shown in FIG. 1 somewhat out of scale for clarity of illustration.

The forming station 20 comprises a male plunger or mandrel 22 supported from a suitable frame or manifold 24 connected to a mechanism 26 for advancing and retracting the plunger. Such mechanisms are well known in the art, and may comprise cam mechanisms, or hydraulic mechanisms, or other suitable mechanisms. The supporting frame or manifold 24 is connected by a flexible air line 28 to a suitable source of air pressure 30.

The forming station also includes a female mold 32 having a cavity 34 therein of generally frusto-conical configuration, and having a bottom in the form of a knock-out or ejecting member 36. The mold 32 is connected by suitable supporting means 38 to an advance mechanism 40, and the bottom or knock-out member 36 is connected by a stem or connecting rod 42 to the advance mechanism 40. The advance mechanism 40, like the advance mechanism 26, may be of any suitable or known type, such as a cam mechanism or a hydraulic mechanism.

It is within the contemplation of the invention that the plunger 22 and the cavity 34 might comprise a plurality of respectively aligned plungers and cavities, as is known in the art. An upper clamp 44 and a mating lower clamp 46 are provided on opposite sides of the web 10. Each of the clamps 44, 46 is circumferentially continuous, and in the case of a circular cup or other container, each clamp preferably is annular in configuration. As also is known in the art, when a plurality of plungers and cavities is provided, the clamps would have a plurality of openings therein, one for each aligned plunger and cavity. The upper clamp 44 is connected by suitable supports 48 to an upper clamping mechanism 50, and the lower clamp 46 is similarly connected by suitable supports 52 to a similar lower clamping mechanism 54. The clamping mechanism 50 and 54 can be of any suitable or known configuration, such as cam or hydraulic mechanisms.

Referring now to FIGS. 2–5, the mandrel or plunger 22 will be seen to be of frusto-conical configuration, having a frusto-conical sidewall 56 merging at a rounded lower shoulder 58 with an annular ring bottom wall 60. The bottom is provided with a beveled recess 62 which is counter-bored at 64. A stud or bolt 66 extends axially through the plunger from the counter-bore 64 up into the supporting frame or manifold 24 to which it is secured.

The frame or manifold is provided with an annular recess 68 above the periphery of the mandrel. It further is provided with a vertical bore 70 through which the stud 66 extends concentrically. A sleeve 72 extends between the frame or manifold 24 and the mandrel, and is provided with a central bore 74 concentric with, and spaced from the stud 66. The sleeve 72 is provided with arcuately spaced apertures 76 extending radially through the wall of the sleeve.

The female mold 32 determines the ultimate shape of the cup to be formed from the plastic 10 and the cavity 34 therein is defined by a frusto-conical sidewall 78 slightly larger than the plunger 22. The mold is provided at the upper end of the cavity with an upwardly projecting, rounded-over lip or rim 80 encircled by an external shoulder 82 slightly below the lip or rim, and integral therewith. The outer diameter of the shoulder is such as to fit snugly within the outer diameter of the frame or manifold annular recess 68, while the difference in diameter between the shoulder 82 and rim or lip 80 is substantially equal to the thickness of the plastic web 10, i.e., about .010–.015", for example. (This dimension is somewhat magnified in the drawings for clarity of illustration.)

The bottom member or knock-out 36 fits within the cavity 78 in the retracted position of the bottom member as shown in the drawings. The upper surface of the member 36 comprises a peripheral ring portion 84, and a raised central portion 86, both of which are flat and horizontal. The ring portion 84 and the raised central portion 86 are interconnected by a beveled or frusto-conical portion 88.

As will be understood, the clamps 44 and 46 are retracted from time to time to allow the belts 14 to move the web 10 forward a suitable increment. When the web has been moved, and brought to a halt, the clamps 44 and 46 are brought into clamping engagement against the web as shown in FIGS. 1–5. At this time, the plunger and mold cavity are spaced apart in the positions shown in FIGS. 1 and 2. The advance mechanism 26 first advances the mandrel or plunger 22 as shown in FIG. 3 mechanically to draw the plastic material 10 demarcated by the clamps 44 and 46 down into the female mold cavity. As will be observed, the plastic material 10 tends to neck down and conform to the sides of the plunger 22, remaining out of contact with the sidewall 78 of the cavity 34 until the plunger has reached substantially its full depth of penetration. The plunger preferably is made of an insulating material or is maintained at a suitable temperature to avoid extracting heat from the plastic material 10. It will be understood that extraction of heat chills and sets the plastic material, and it is not desired for this to happen too soon.

The entering end of the plunger is designed with suitable frictional characteristics to allow controlled slippage of the plastic sheet material thereover, whereby to avoid the production of relatively thin or thick areas.

Approximately at the time the plunger 22 reaches its full depth of penetration, the female mold cavity is moved up to meet the plunger by the bottom advance mechanism 40, to the position shown in FIGS. 4 and 5. As the female mold cavity moves up, the lip or rim 80 thereof engages the plastic material to form a down-turned cup rim or lip 90 therein, the plastic material chilling rather rapidly upon engagement with the mold rim or lip to be set in its final form. The shoulder 82 comes substantially into engagement with the circumference of the recess 68, whereby to clamp the plastic material.

No specific air bleeds are provided in the lower portion of the female mold cavity. Hence, once the cavity lip or rim 80 engages the plastic material, there is a certain amount of air trapped below the plastic material, and above the bottom member 36. As will be understood, the plastic sheet material 10 engages the rim 80 sometime before the complete telescoping of the female mold cavity with the plunger, typically shortly after the female mold cavity has started in its upward movement, whereby the air trapped above the bottom member 36 is somewhat compressed and distends the plastic material up into the recess 62 at the bottom of the plunger, as indicated at 92 in FIG. 4.

The mechanical motion of the parts as just described preforms the desired cup. At this time, the preformed cup substantially conforms to the shape of the sidewall of the plunger and partially to the bottom thereof. Air under pressure from the air pressure source 30 then is introduced through the bore or conduit 70 into the sleeve 74. This air under pressure passes out through the apertures 76 into the space above the plunger 22 and within the recess 68. The air more or less peels the preformed cup off of the sidewall of the plunger 22 and presses it into conformity with the sidewall of the female mold cavity and into engagement with the bottom member 36. The mold is preferably made of metal and is at a low enough temperature so that the plastic is quickly set in the final form of the cup. At this time, the supporting structure or manifold 24 is lowered a slight additional distance, whereby the shoulder at the outer circumference of the ring 68 coacts with the shoulder 82 to sever the cup from the remainder of the plastic material 10. It is to be understood that the severing could be effected before the final blowing.

As will be apparent, some egress must be provided for air beneath the sheet within the cavity during the final blowing. This is conveniently done (as shown in the drawings) by providing clearance about the member 36 (i.e., a loose fit in the cavity 78). This provides a "slow leak" whereby sufficient air will be trapped to effect the billowing of FIG. 4, and will yet permit blowing to the final form of FIG. 5.

Subsequently, the plunger is raised above the initial position of FIGS. 1 and 2, as shown in broken lines in FIG. 5. The mold is lowered, and at the same time, the bottom member or knock-out 36 is raised to eject the finished cup as indicated at 94 in broken lines in FIG. 5.

The finished cup is shown in cross section in FIG. 6, and conforms to the shape of the female mold, including the rolled-over upper rim 90, a frusto-conical sidewall 96, and a bottom 98. The bottom comprises an outer ring portion 100, a frusto-conical portion 102 having an included angle of greater than 90 degrees, and a central raised portion or floor 104. A raised or indented bottom portion is most important in providing adequate strength to prevent snagging or "oil canning" of the otherwise rather flexible bottom.

It will be appreciated that the initial contact of the mold rim 80 with the mechanically drawn plastic material is a sliding contact, and takes place only after the plastic has been drawn almost to the full extent necessary to form the cup. Thus, this initial engagement of the rim with the plastic material does not cause the plastic to chill and set to any great degree. Any degree of setting is relatively unimportant, since the plastic is not drawn to any substantial extent after engagement by the rim, and there is therefore no problem of thickened areas such as would be produced by chilling before drawing.

The air trapped within the female mold cavity beneath the plastic effects a cushioned support of the central portion of the drawn plastic, whereby the distention thereof up into the recess in the plunger causes no thinning of the cup at the lower corners thereof. Furthermore, the trapped air maintains the plastic substantially completely out of engagement with the mold cavity, except at the rim thereof.

The discharge of air above the top of the mandrel produces a substantially uniform pressure on the inside of the mechanically predrawn cup, whereby to complete formation of the cup without localized stretching and thinning of the material, such as might be the case were air pressure provided only at the lower end of the mandrel in a localized position.

The uniform nature of the pressure causes the bottom to be expanded or blown down into the bottom member 36 substantially in the shape in which it is distended up into the mandrel, whereby the bottom shape is already partially predetermined before engagement with the bottom member.

As a result of the foregoing, the cup produced is of extraordinarily uniform thickness. The cup thus has no weak spots, particularly along the bottom corners, while requiring only a minimum of material.

The specific example of the invention as herein shown and described is for illustrative purposes only. Various changes will no doubt occur to those skilled in the art and will be understood as forming a part of the present invention insofar as they fall within the spirit and scope of the appended claims.

The invention is claimed as follows:

1. The process of forming a cup or the like of plastic sheet material which comprises supporting a sheet of such material in plastic condition in spaced relation from a female mold cavity having a central projection extending into the cavity from the bottom thereof, mechanically drawing a portion of said plastic sheet material into said female mold cavity with an implement having an imperforate central recess aligned with said cavity projection, effecting a seal between the mechanically drawn plastic material and said female mold cavity to trap air between said mechanically drawn plastic material and said female mold cavity to hold a substantial portion of said plastic material out of contact with said female mold cavity utilizing the trapped air to distend the plastic material part way into the recess of the mechanical drawing implement, and subsequently establishing a differential of fluid pressure across the mechanically drawn plastic material with greater pressure within than without said mechanically drawn plastic material to conform said plastic material to said female mold cavity.

2. The process of forming a cup or the like of plastic sheet material which comprises supporting a sheet of such material in plastic condition in spaced relation from a female mold cavity, mechanically drawing a portion of said plastic sheet material into said female mold cavity, effecting a seal between the mechanically drawn plastic material and said female mold cavity to trap air between said mechanically drawn plastic material and said female mold cavity to hold a substantial portion of said plastic material out of contact with said female mold cavity, utilizing said trapped air to effect outward distention of a central portion of said mechanically drawn plastic material during the drawing thereof and discharging fluid under pressure into the mechanically drawn sheet material in the vicinity of the initial plane of the sheet to expand the mechanically drawn plastic material into conforming relation with said female mold cavity.

3. The process of forming a cup or the like of plastic sheet material which comprises supporting a sheet of such material in plastic condition in spaced relation from a female mold cavity having a central proturberance extending from the bottom of the cavity into the cavity, mechanically drawing a portion of said plastic sheet material into said female mold cavity with an implement having an imperforate central recess aligned with said protuberance, effecting a seal between the mechanically drawn plastic material and said female mold cavity to trap air between said mechanically drawn plastic sheet material and said female mold cavity to hold a substantial portion of said plastic material out of contact with said female mold cavity and out of engagement with said protuberance, utilizing the trapped air to distend said plastic material into said recess in said implement, and subsequently discharging fluid under pressure into said mechanically drawn sheet material in the vicinity of the initial plane of said sheet to expand the mechanically drawn plastic sheet material into conforming relation with said female mold cavity.

4. Apparatus for forming a cup or the like of plastic sheet material comprising means for supporting a sheet of such material in plastic condition, a female mold cavity disposed on one side of said sheet in spaced relation thereto, a plunger disposed on the other side of said sheet in alignment with said female mold cavity, said plunger having a sealed recess in the entering end, means for advancing said plunger into engagement with said sheet material mechanically to draw a portion of said sheet material into said female mold cavity, means for effecting a seal between the mechanically drawn plastic sheet material and said female mold cavity to trap air between said mechanically drawn plastic material and said female mold cavity, means effective after such sealing relatively to advance said mechanically drawn plastic sheet material and said female mold cavity to compress the air trapped and thereby to hold at least some of said mechanically drawn sheet material out of engagement with said female mold cavity and to distend some of said plastic material into said recess, means for thereafter establishing a fluid pressure differential across said mechanically drawn plastic sheet material to force said mechanically drawn sheet material into conforming relation with said female mold cavity, said means for establishing a fluid pressure differential across said mechanically drawn plastic sheet material comprising a sleeve extending from the end of said plunger opposite the entering end, said sleeve having a plurality of radial apertures therein for discharging fluid under pressure about the adjacent end of said plunger.

References Cited by the Examiner

UNITED STATES PATENTS

| | | | |
|---|---|---|---|
| 1,908,774 | 5/1933 | Maier | 18—44 |
| 2,230,189 | 1/1941 | Ferngren | 18—19 |
| 2,365,637 | 12/1944 | Helwig | 18—56 |
| 2,442,965 | 6/1948 | Thomas | 18—19 X |
| 2,531,539 | 11/1950 | Smith | 18—19 |
| 2,552,051 | 5/1951 | Margulies | 229—1.5 |
| 2,602,191 | 7/1952 | Joy | 18—45 |
| 2,694,227 | 11/1954 | Nordyce et al. | 18—56 |
| 2,737,332 | 3/1956 | Amberg et al. | 229—1.5 |
| 2,891,280 | 6/1959 | Politis | 18—19 X |
| 2,910,728 | 11/1959 | Rowe | 18—19 |
| 3,027,596 | 4/1962 | Knowles | 18—19 |
| 3,059,810 | 10/1962 | Edwards | 18—19 X |

FOREIGN PATENTS 234,341    2/1960    Australia.

WILLIAM J. STEPHENSON, *Primary Examiner,*

EARLE DRUMMOND, *Examiner.*